United States Patent
May

(10) Patent No.: US 6,671,677 B2
(45) Date of Patent: Dec. 30, 2003

(54) SYSTEM AND METHOD FOR REDUCING MORTGAGE INTEREST RATE AND MORTGAGE GUARANTY INSURANCE PREMIUMS ASSOCIATED WITH A MORTGAGE LOAN

(75) Inventor: Andrew W. May, Greensboro, NC (US)

(73) Assignee: American International Group, Inc., New York, NY (US)

( * ) Notice: Subject to any disclaimer, the term of this patent is extended or adjusted under 35 U.S.C. 154(b) by 204 days.

(21) Appl. No.: 09/861,136

(22) Filed: May 18, 2001

(65) Prior Publication Data

US 2002/0059136 A1 May 16, 2002

Related U.S. Application Data

(60) Provisional application No. 60/249,422, filed on Nov. 16, 2000.

(51) Int. Cl.[7] ............................................. G06F 17/60
(52) U.S. Cl. ........................... 705/38; 705/35; 705/39
(58) Field of Search .......................... 705/35, 38, 39, 705/4

(56) References Cited

U.S. PATENT DOCUMENTS

| | | | |
|---|---|---|---|
| 5,819,230 A | 10/1998 | Christie et al. | |
| 5,852,811 A | 12/1998 | Atkins | |
| 5,864,828 A | 1/1999 | Atkins | 705/36 |
| 5,875,437 A | 2/1999 | Atkins | |
| 5,930,776 A * | 7/1999 | Dykstra et al. | 705/35 |
| 5,966,700 A | 10/1999 | Gould et al. | 705/38 |
| 5,995,947 A | 11/1999 | Fraser et al. | 705/38 |
| 6,016,482 A * | 1/2000 | Molinari et al. | 705/35 |
| 6,345,262 B1 * | 2/2002 | Madden | 705/35 |

FOREIGN PATENT DOCUMENTS

| WO | WO 91/11772 | * 8/1991 | G06F/15/21 |
|---|---|---|---|

OTHER PUBLICATIONS

Sicks, Chris, PMI takes a beating, but it can help the little guy, Washington Times, Sep. 24, 1999.*
Cohn, Meredith, Housing Market Will have Trouble matching 1999 Pace, Virginian—Pilot, Jan. 23, 2000.*
Private mortgage insurance (c) 1999–2002 easierhomeloans.*
Oak Tree Corporation Loan Programs obtained from http://web.archive.org/web/20000617142512/http://oaktreemortgage.com/programsframe.htm (archive date Jun. 17, 2000).*
Lim, Paul J; Mortgage Math: Clever Calculations can help keep the lid on payments, U.S. New and World Report, Aug. 7, 2000.*
"Mortgage Insurance Financing matrix", Freddie Mac, Dec. 2000.*

* cited by examiner

*Primary Examiner*—Hani M. Kazimi
*Assistant Examiner*—Jagdish N Patel
(74) *Attorney, Agent, or Firm*—Proskauer Rose, LLP

(57) ABSTRACT

In the present invention, a system and method is described for reducing the mortgage interest rate and mortgage guaranty insurance premium associated with a mortgage loan by financing discount points into the mortgage loan at origination. In addition, the mortgage guaranty insurance premium is determined based on the original loan-to-value (LTV) percent, independent of the amount of discount points financed into the original loan.

27 Claims, 5 Drawing Sheets

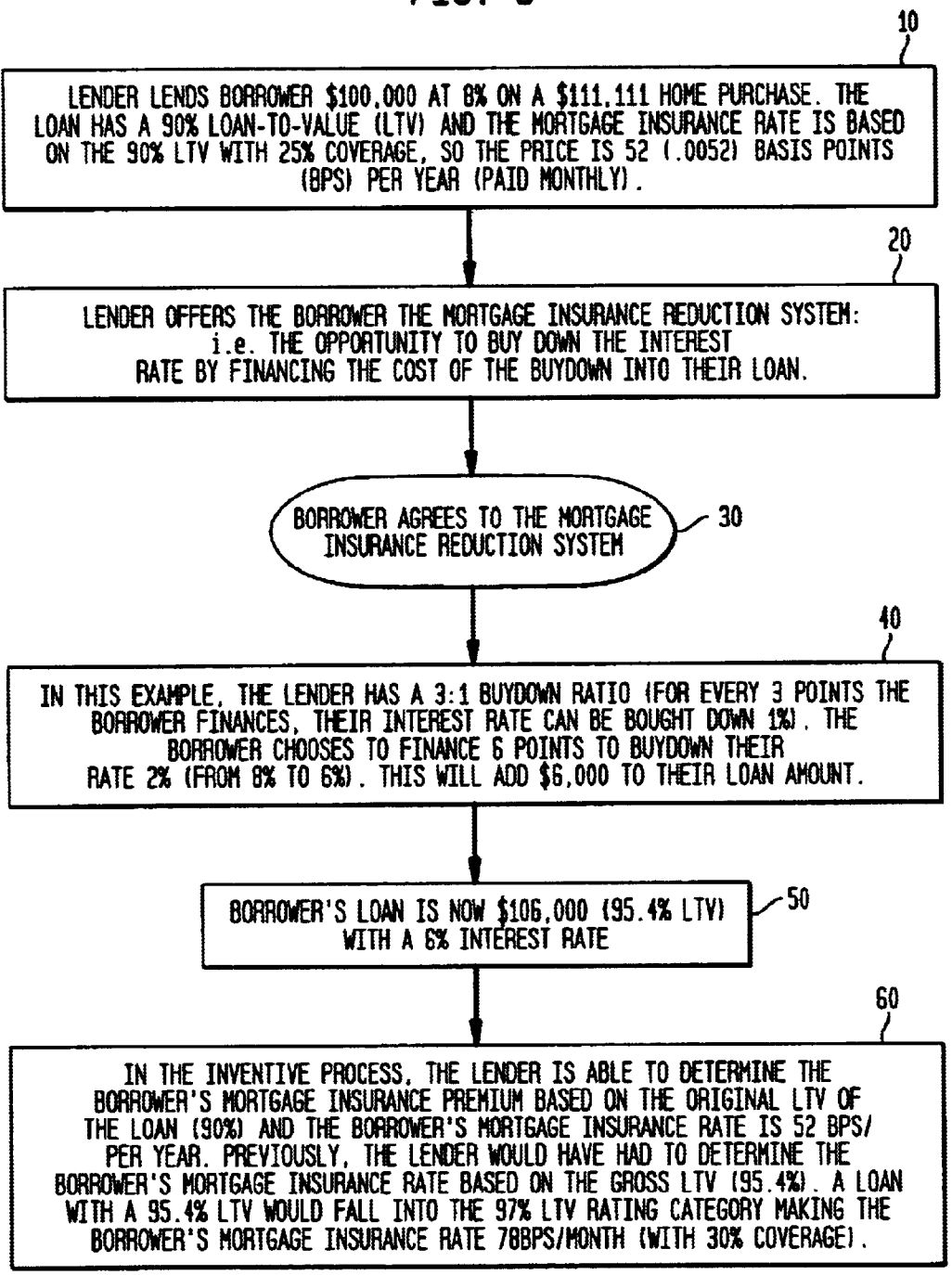

FIG. 4

MORTGAGE RATE REDUCTION SYSTEM EXAMPLE
$111,111 PURCHASE PRICE-90% LTV

BUYDOWN TABLE WITH BORROWER VALUATIONS

STEP 205 ORIGINAL BORROWER

| | 220<br>30 YEAR FRM* | 225<br>15 YEAR* | 230<br>5/1 ARM* | 235<br>7/1 ARM* | 240<br>10/1 ARM* |
|---|---|---|---|---|---|
| PRUCHASE PRICE | 111,111 | 111,111 | 111,111 | 111,111 | 111,111 |
| ORIGINAL LOAN | 100,000 | 100,000 | 100,000 | 100,000 | 100,000 |
| ORIGINAL LTV | 90% | 90% | 90% | 90% | 90% |
| ORIGINAL COVERAGE | 25% | 12% | 25% | 25% | 25% |
| ORIGINAL MONTHLY MI PRICE | 0.52% | 0.23% | 0.52% | 0.52% | 0.52% |
| ORIGINAL INTEREST RATE | 8.00% | 7.41% | 7.13% | 7.42% | 7.63% |
| LOAN TERM (MONTHS) | 360 | 180 | 360 | 360 | 360 |
| ORIGINAL P&I PAYMENT WITH MI | $777 | $941 | $717 | $737 | $751 |

\* INTERMEDIATE ARM RATES ARE FROM REGIONS MORTGAGE, 15 AND 30 YR FRM ARE RFC-GMAC. DATES VARY

STEP 210 BUYDOWN OPTION SELECTED

SAMPLE BUYDOWN TABLE (OPTIONS TO CUSTOMER/BORROWER)

POINTS CHARGED FOR RATE REDUCTION — MINIMUM RATE REDUCTION REQUIRED

| | 30 YEAR FRM | 15 YEAR | 5/1 ARM | 7/1 ARM | 10/1 ARM |
|---|---|---|---|---|---|
| 1% | 0.20% | 0.25% | 0.33% | 0.33% | 0.25% |
| 2% | 0.40% | 0.50% | 0.67% | 0.67% | 0.50% |
| 3% | 0.60% | 0.75% | 1.00% | 1.00% | 0.75% |
| 4% | 0.80% | 1.00% | 1.33% | 1.33% | 1.00% |
| 5% | 1.00% | 1.25% | 1.67% | 1.67% | 1.25% |
| 6% | 1.20% | 1.50% | 2.00% | 2.00% | 1.50% |

MARGIN LIMITATION OF 3% ASSUMED.

STEP 215 POST-FINANCED BUYDOWN PERSPECTIVE

BORROWER SELECTS 6 POINT OPTION

| | 30 YEAR FRM | 15 YEAR | 5/1 | 7/1 | 10/1 |
|---|---|---|---|---|---|
| PURCHASE PRICE | 111,111 | 111,111 | 111,111 | 111,111 | 111,111 |
| NEW LOAN AMOUNT | 106,000 | 106,000 | 106,000 | 106,000 | 106,000 |
| LTV | 95.4% | 95.4% | 95.4% | 95.4% | 95.4% |
| COVERAGE | 25% | 12% | 25% | 25% | 25% |
| MI PREMIUM (MONTHLY) | 0.52% | 0.23% | 0.52% | 0.52% | 0.52% |
| NEW INTEREST RATE | 6.80% | 5.91% | 5.13% | 5.42% | 6.13% |
| LOAN TERM (MONTHS) | 360 | 180 | 360 | 360 | 360 |
| NEW P&I PAYMENT WITH MI | $737 | $910 | $623 | $642 | $690 |
| MONTHLY SAVINGS TO THE BORROWER | $40 | $31 | $94 | $95 | $61 |

250

US 6,671,677 B2

SYSTEM AND METHOD FOR REDUCING MORTGAGE INTEREST RATE AND MORTGAGE GUARANTY INSURANCE PREMIUMS ASSOCIATED WITH A MORTGAGE LOAN

RELATED APPLICATION

This application is based upon provisional application Ser. No. 60/249,422, entitled "SYSTEM AND METHOD FOR REDUCING MORTGAGE INTEREST RATE AND MORTGAGE GUARANTY INSURANCE PREMIUMS ASSOCIATED WITH A MORTGAGE LOAN," filed on Nov. 16, 2000 for Andrew W. May. The contents of this provisional application are fully incorporated herein by reference.

FIELD OF THE INVENTION

The present invention relates to a method and system for computing mortgage interest rates and mortgage guaranty insurance premiums associated with a financial product such as a mortgage loan. More specifically, the present invention relates to a method and system for reducing the mortgage interest rate and mortgage guaranty insurance premiums associated with the mortgage loan by financing discount points into the mortgage loan.

BACKGROUND OF THE INVENTION

Private mortgage guaranty insurance ("PMI") is insurance that protects the lender (e.g., the mortgagor) in case of default by the borrower (e.g., the mortgagee). Typically, the lender can purchase mortgage guaranty insurance for a loan with a loan-to-value ("LTV") up to 100% or more. However, some states restrict LTV to a 97% maximum. LTV is the percentage of the loan in relation to the value of the property. The value is typically the lesser of the sales price, appraised value, or broker price opinion of the related property. For example, assume that the value and purchase price of a house is $111,111 and borrower wishes to take out a $100,000 mortgage loan. In this scenario, the LTV is 90%. That is, 90% of $111,111 is the $100,000 mortgage loan.

Generally speaking, all mortgages are originated in the primary market. Mortgage guaranty insurance helps maintain liquidity in the secondary market. Investors, such as Fannie Mae, Freddie Mac, banks, etc., require "investment-quality" mortgages. Private mortgage guaranty insurance is one method for making the loans "investment-quality." For example, Fannie Mae and Freddie Mac require mortgage guaranty insurance on all low down payment loans (loans with LTVs above 80%). Once a mortgage originates in the primary market, such mortgage may be bought, sold, and traded to other lenders, government agencies, or investors in the secondary market.

FIG. 1 is a flow chart summarizing a conventional mortgage finance system. In step 1 of FIG. 1, a lender, such as a savings bank, provides a mortgage loan to a home buyer (the borrower). In step 2, the lender may sell the mortgage, alone or packaged with other mortgages it owns, to an investor such as Fannie Mae or Freddie Mac. In step 3, the investor typically packages the mortgage(s) as securities and sells them to other investors or holds the mortgage(s) or mortgage-backed securities as part of its portfolio. In step 4, the lender uses the capital gained from the secondary market, i.e., the investors, to offer more loans.

Mortgage rates and mortgage guaranty insurance premiums are determined by a number of factors, such as LTV, debt-to-income and other borrower ratios, credit score, and a number of additional variables.

Borrowers, as well as mortgage sellers, builders, and relocating employers, typically have an option to pay a "buydown" to lower their interest rate. A conventional buydown is an up-front payment of cash for a reduction, over time, in the mortgage interest rate. In addition, there are different types of buydowns: temporary and permanent. An example of a temporary buydown is a 3–2–1 buydown that reduces the interest rate on a loan by 3% in the first year, 2% in the second year and 1% in the third year. In the fourth year, the interest rate on the loan returns to the market interest rate. Generally, either the borrower, mortgage seller, builder, or relocating employer will pay for the temporary buydown.

In a permanent buydown, the interest rate on the loan is bought down permanently for the life of the loan. Generally, the borrower pays for the buydown by either paying an up-front cash payment at closing, or financing "discount points" into their loan amount. Each discount point typically costs the borrower 1% of the loan amount and lowers the mortgage rate from 0.2 to 0.33% depending on the lender, length of loan, borrower's credit, and other factors.

Conventionally, the cost of the discount points is added to the mortgage loan amount. For example, a $100,000 mortgage loan with six discount points on a $111,111 purchase price, would accrue a new mortgage loan amount of $106,000 and an LTV of 95.4%. That is, 95.4% of $111,111 is the $106,000 new mortgage loan. Thus, the LTV with six points increases substantially from the 90% LTV without any points. Since mortgage guaranty insurance premiums are based heavily on LTV percentage, an LTV of 95.4%, as opposed to an LTV of 90%, would cost the borrower significantly higher mortgage guaranty insurance premiums (PMI).

SUMMARY OF THE INVENTION

The present invention is directed to a method for reducing the mortgage guaranty insurance premium of a mortgage (fixed or adjustable rate) or piggyback loan having. Illustratively, an original loan-to-value (LTV) ratio of the loan is determined. The original LTV is the ratio of the amount of the loan to a value of the associated property. For example, the value may be the lesser of a sales price, appraisal, and broker price opinion of the associated property.

A cost of at least one discount point (the buydown) is added to the amount of the loan to reduce the interest rate of said loan. For example, the cost of each discount point typically equals one percent of the amount of the loan. Note that the lender determines the amount that each discount point will reduce the interest rate. For example, some lenders may reduce the interest rate by 0.20 percent for each discount point purchased, while other lenders may reduce the interest rate by 0.33 percent.

Next, the mortgage guaranty insurance premium is determined based on the original LTV. In other words, it is determined independent of the cost of the buydown.

In a further embodiment, a gross LTV ratio of the loan is determined. The gross LTV is the ratio of the added cost of the discount points and the amount of the loan to the value of the associated property.

In an additional embodiment, basis points based on the original LTV are determined, such that the insurance premium is further determined based on the amount of determined basis points. The basis points may be determined based on at least one of the following factors: the original LTV; a coverage amount of the insurance; the borrower's debt-to-income ratio; and the credit of the borrower. Note that dozens of other factors may also be used as well.

As an aspect of the present invention, some or all of the steps in the inventive method may be performed by a computerized system.

It is an object of the invention to overcome the deficiencies of the prior art by permitting the borrower to reduce the mortgage rate on a mortgage loan by financing discount points, without increasing the mortgage guaranty insurance premium above the original LTV rate.

It is a further object of the invention to reduce the mortgage guaranty insurance premium when adding the cost of a buydown, such as discount points, to the mortgage loan.

As an advantage of the invention, the financial product and method reduces the minimum income requirement of a borrower.

As an additional advantage, the financial product and method lowers the monthly premium payment of a borrower.

As a further advantage, the financial product and method eliminates the necessity for up-front cash from the borrower at the property closing to cover the buydown cost.

As another advantage, the inventive financial product and method reduces the likelihood of borrowers refinancing their mortgages when rates trend down, since discount points are financed into the original mortgage.

As yet an additional advantage, the inventive financial product and method provides reduced interest rates for enhancing loan performance for lenders and investors.

As yet a further advantage, under the inventive financial product and method, borrowers will qualify for larger loans providing additional profits for lenders and investors.

Such objects and advantages listed above are merely illustrative and not exhaustive. Further, these and other features and advantages of the present invention will become more apparent from the accompanying drawings and the following detailed description.

BRIEF DESCRIPTION OF THE DRAWINGS

The following detailed description, given by way of example and not intended to limit the present invention solely thereto, will best be understood in conjunction with the accompanying drawings in which:

FIG. 3 schematically illustrates the method for reducing the mortgage interest rate and mortgage guaranty insurance premium associated with a mortgage loan, in accordance with the present invention;

FIG. 4 is a three step chart illustrating a borrower's savings using the process of FIG. 2, in accordance with the present invention.

DETAILED DESCRIPTION OF PREFERRED EMBODIMENTS

One embodiment of the present invention, hereinafter called the "mortgage insurance reduction system", allows borrowers to buydown the mortgage interest rate of a mortgage loan by financing discount points into the loan at origination. In addition, the present invention permits the financing of the discount points without an increase in the mortgage guaranty insurance premium above the original premium, determined prior to financing the discount points into the loan. As will be described in greater detail below, the insurance premium is based on the original loan-to-value (LTV) ratio. Note that the inventive method is fully applicable to "piggyback" loans and "spread accounts," as well as to traditional mortgages described herein.

A piggyback loan is a loan in which the buyer takes a first mortgage to finance part of the value of the property and a second mortgage to finance another part of the value. For example, a buyer could put 10% down, then take out a first mortgage for 80% of the home's value and second mortgage for the remaining 10% of its value. The two mortgages together are called a piggyback loan.

A spread account may be a form of credit enhancement created by funding the spread account with excess monthly cash flow from a plurality of loans. Often, this account absorbs mortgage losses up to a stated cap.

Figure 1:
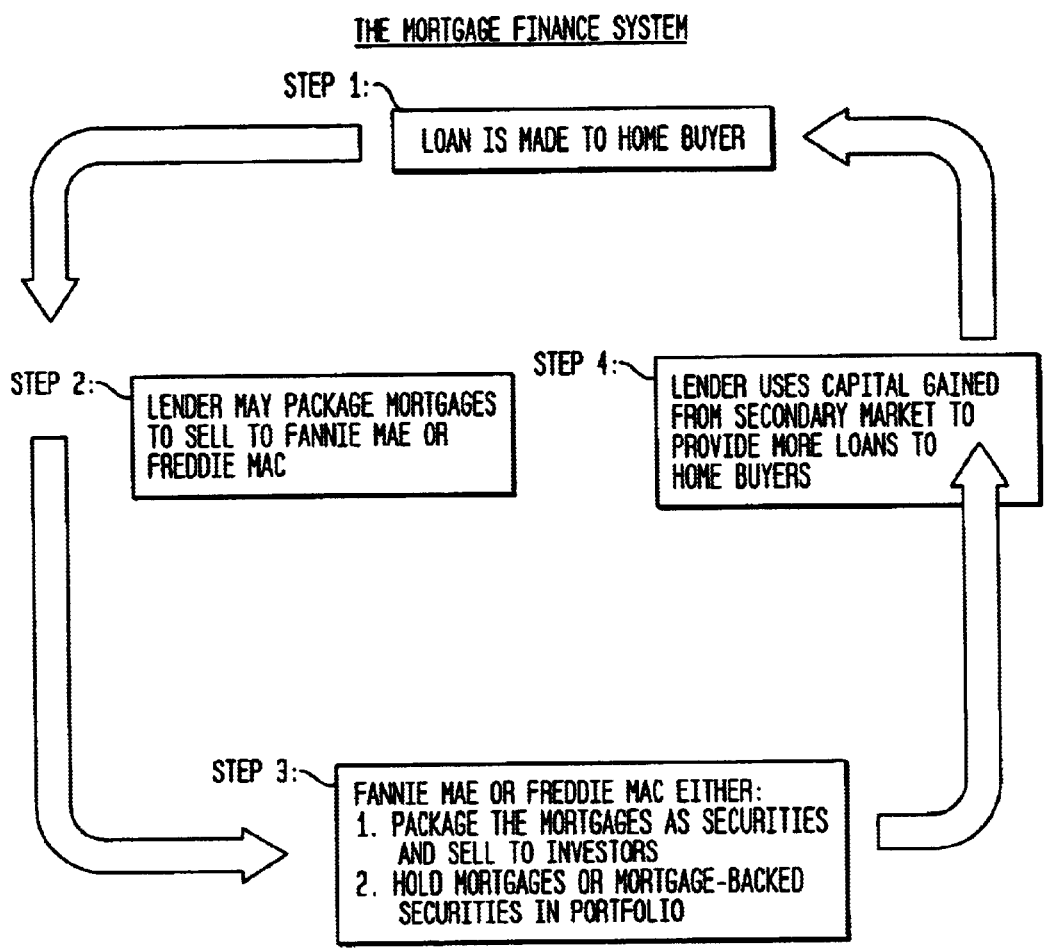
FIG. 1 schematically illustrates a conventional mortgage finance system.
Figure 2:
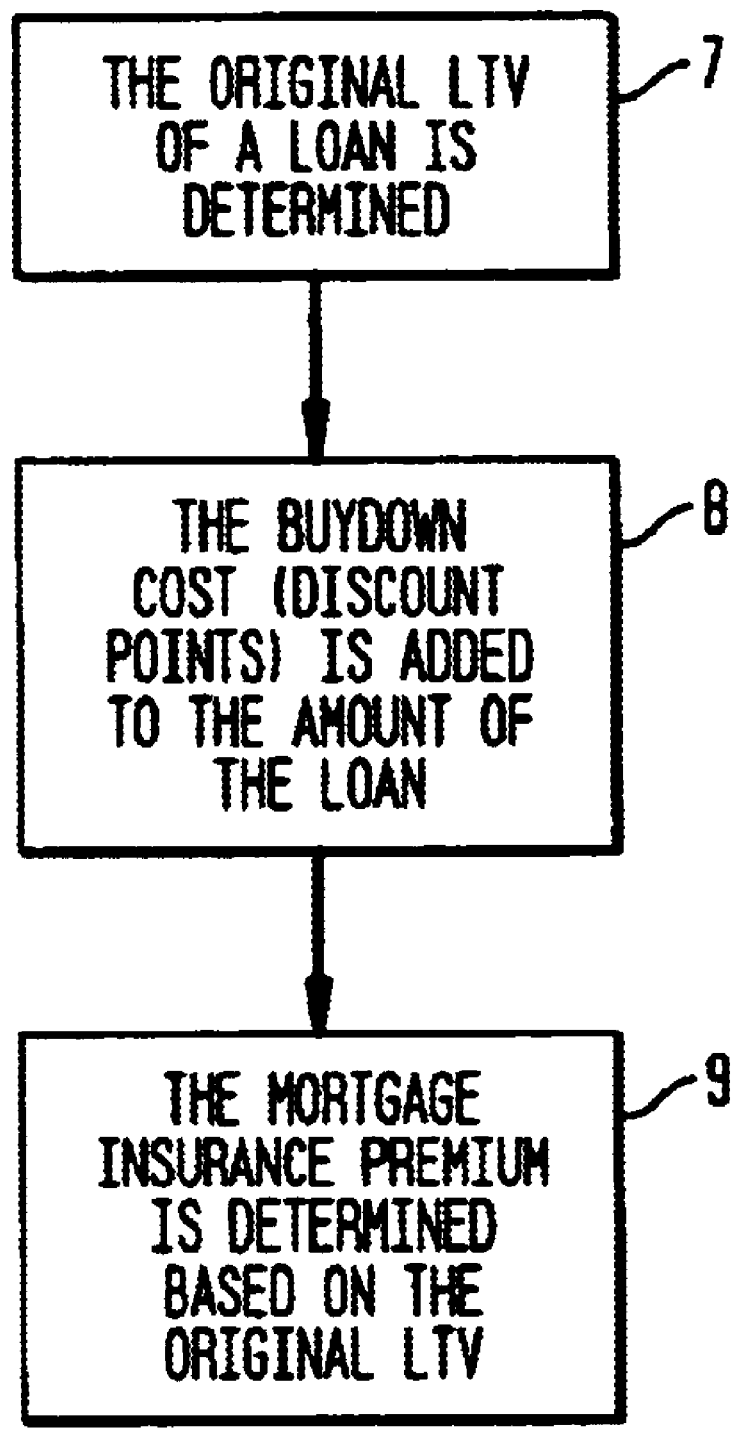
FIG. 2 is a flow chart that illustrates one embodiment of the method for calculating the mortgage guaranty insurance premium, in accordance with the present invention.

FIG. 2 is a flow chart that illustrates one embodiment of a method for calculating the mortgage guaranty insurance premium. In step 7, the original LTV of a loan is determined. The original LTV is the ratio of the amount of the loan to the "value" of the associated property. For example, a loan of $100,000 for a home valued at $111,111 has an LTV of 90%. The "value" may be determined based on, e.g., the sales price, appraisal, or broker price opinion of the property. Typically, the value will be the lesser of the sales price, appraisal, and opinion.

In step 8, a buydown cost is added to the amount of the loan. As previously stated, the buydown cost is the cost of discount points that the borrower "buys" to lower the interest rate. Instead of paying out in cash for the discount points at, e.g., the closing, the borrower finances the cost of the points into the loan. The cost of each discount point equals one percent of the amount of the loan, and each discount point reduces the interest rate 0.20 to 0.33 percent, depending on the type of the loan, the time length of said loan, a loan lender, a mortgage guaranty insurer, and credit of the borrower. Typically, a maximum of six discount points may be bought by the buyer to buydown the interest rate. However, some insurance companies have lowered the ceiling to three discount points.

In step 9, the mortgage guaranty insurance premium is determined based on the original LTV. That is, the premium is determined independent of the cost of the buydown. Illustratively, the original LTV is used to determine the amount of "basis points" for the loan. Each basis point equals $\frac{1}{100}$% of the premium. For example, if a 90% LTV equates to 52 basis points (bps), then the premium is 0.52% of the loan amount per year. This mortgage guaranty insurance premium is usually paid monthly. Thus, the yearly premium for a $100,000 loan is $520 or $43.33 monthly. Note, however, that other factors besides for the original LTV may determine the amount of basis points. For example, the coverage amount, length of the loan, the borrower's debt-to-income ratio, and the credit rating of the borrower often factor into the determination.

FIG. 3 is a flow chart that illustrates an example of the mortgage insurance reduction system of the present invention. In step 10, as in FIG. 2, a lender lends the borrower $100,000 at an 8% interest rate on a $111,111 home purchase. Accordingly, the loan has an original 90% LTV (100,000/111,000) and the mortgage guaranty insurance rate is based on the 90% LTV. As stated in reference to FIG. 2, the mortgage guaranty insurance rate is calculated in "basis points" (bps). In this example, the basis points are 52 bps, which equals 0.52% of the loan amount per year, paid monthly.

In step 20, the lender, e.g., the savings bank, offers the borrower the option of using the inventive mortgage guaranty insurance reduction system to buydown the interest rate, via discount points, by financing the cost of the buydown into the loan. The borrower accepts the mortgage guaranty insurance reduction system in step 30. Step 40 illustrates that in this scenario, the lender has a 3:1 buydown ratio. That is, for every three points the borrower finances, the interest rate can be bought down 1%). Further, in step 40, the borrower chooses to finance six points to buydown the mortgage rate 2% (i.e., 0.33% per point) which lowers the interest rate from 8% to 6%. This adds $6,000 to the loan amount ($100,000×0.06). In step 50, the borrower's loan is now $106,000 with a gross LTV of 95.4% but with a 6% interest rate.

In step 60, using the mortgage guaranty insurance reduction system, the lender is able to determine the borrower's mortgage guaranty insurance premium based on the original LTV of the loan (90%) and the borrower's mortgage guaranty insurance rate is the original 52 bps/per year. Without the mortgage guaranty insurance reduction system, the lender would have to determine the borrower's mortgage guaranty insurance rate based on the gross LTV of 95.4%. A loan with a 95.4% LTV would typically fall into the 97% LTV rating category, which translates into a mortgage guaranty insurance rate between 78 bps and 90 bps/per year.

FIG. 4 is a chart illustrating the borrower's savings using the mortgage insurance reduction system of FIG. 3 for different types of mortgages and different amounts of discount points financed. As shown, the types of loans may be fixed rate mortgages or adjustable rate mortgages. Columns 220 and 225 represent a 30 year and a 15 year fixed mortgage, respectively. Columns 230, 235, and 240 represent a 5/1, 7/1, and 10/1 adjustable rate mortgage ("ARM"), respectively.

In step 205, the purchase price, original loan amount, original LTV, original coverage, original monthly mortgage insurance (MI) price, original interest rate, loan terms in number of months, and original principal and interest (P&I) payment with the mortgage insurance, for each type of loan, is shown prior to the implementation of the inventive mortgage insurance reduction system of FIGS. 2 and 3.

In step 210, the borrower selects the amount of the buydown, one to six discount points. The minimum rate reduction is illustrated depending on the amount of points and depending on the length and type of the loan.

In step 215, the purchase price, new loan amount, gross LTV, original coverage, monthly MI price, new interest rate, loan terms, and new P&I payment added with MI, for each type of loan, is shown after the implementation of the inventive mortgage insurance reduction system of FIGS. 2 and 3. Note that the mortgage insurance premium (0.52% or 0.23%) remains the same after implementation. Lastly, column 250 shows the monthly savings of the borrower.

Figure 5:
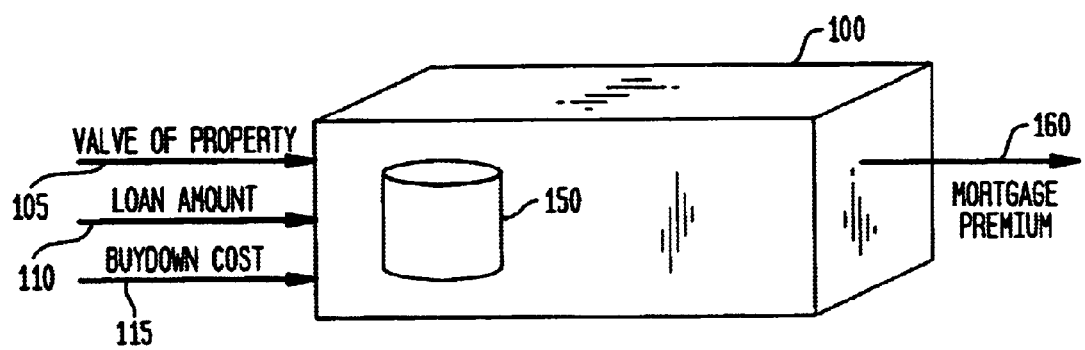
FIG. 5 schematically illustrates a computer system used to calculate the borrower's mortgage guaranty insurance premium according to the process of FIG. 2, in accordance with the present invention.

Illustratively, the process of FIG. 2 may be implemented by a computer system 100, shown in FIG. 5. Generally, computer system 100 will have a local hard drive 150 that stores a software program to compute the insurance premium. Such software program may be written in any desired programming language, such as C++ or Java. In addition, the software program may be located at a remote server across the Internet or over a dedicated line (not shown). Further, the process of FIG. 2 may be implemented in hardware or firmware (not shown). As illustrated, the inputs to the computer system 300 are the property value 105, the loan amount 110, and the buydown cost 315. The output of computer 100 is the mortgage insurance premium 160. Of course, other data may be input into or output from computer system 100, such as the data shown in steps 205, 210, and 215 of FIG. 4.

In summary, it is important to note that with the mortgage guaranty insurance reduction system, the up-front payment of cash is financed over the life of the loan (e.g., 30 years) and, as stated above, the lender (and ultimately the borrower) is charged a mortgage guaranty insurance rate premium based on the original LTV. The 30-year amortization decreases the borrower's payments, while at the same time allowing the lender to get paid in fees up-front out of the mortgage proceeds. In addition, the discount points paid by the borrower may be tax deductible and act as a pre-payment hedge on the loan. An additional benefit for the borrower is that the loan is underwritten at the bought-down interest rate and which allows the borrower to qualify for a larger home.

Finally, it should be understood that the foregoing description is merely illustrative of the invention. Numerous alternative embodiments within the scope of the appended claims will be apparent to those of ordinary skill in the art.

What is claimed is:

1. A method for reducing at least one of insurance rates and insurance premiums associated with a financial product, comprising the steps of:

determining an original loan-to-value (LTV) ratio of a financial product, said financial product having an amount and an interest rate associated therewith, wherein said financial product necessitates a purchase of insurance for said financial product when said original LTV ratio exceeds a first pre-determined level, and wherein a first insurance premium would be charged for said insurance if said first insurance premium were based on said original LTV ratio;

adding a cost of a buydown to the amount of said financial product, wherein said interest rate of said financial product is reduced as a result of said buydown;

achieving a gross LTV ratio that is increased from said original LTV ratio as a result of adding the cost of said buydown to the amount of said financial product, wherein, when said gross LTV ratio exceeds a second pre-determined level as a result of the added cost of said buydown, the first insurance premium charged would be increased to a second insurance premium higher than the first insurance premium and corresponding to said gross LTV ratio if said gross LTV ratio were used to determine the insurance premium that should be charged for said insurance; and offering said insurance for the first insurance premium based on said original LTV ratio rather than on said gross LTV ratio, thereby effectively reducing the insurance premium charged for said insurance from the second insurance premium to the first insurance premium, wherein the first insurance premium at which said insurance is offered is determined through usage of a computer.

2. The method of claim 1, wherein said financial product is a loan.

3. The method of claim 2, wherein said loan is one of a mortgage loan, a piggy-back loan, and a spread account.

4. The method of claim 1, wherein said first and second insurance premiums are mortgage guaranty insurance premiums.

5. The method of claim 1, wherein said original LTV ratio is the ratio of the amount of said loan to a value of an associated property.

6. The method of claim 5, wherein said value in said original LTV ratio and in said gross LTV ratio is the least of a sales price, appraisal, and broker price opinion.

7. The method of claim 1, wherein the cost of said buydown is the cost of at least one discount point.

8. The method of claim 7, wherein the cost of each said discount point equals one percent of the amount of said loan.

9. The method of claim 8, wherein each said discount point reduces said interest rate within a range of approximately 0.20 to 0.33 percent.

10. The method of claim 9, wherein the amount of the reduction of said interest rate is further based on at least one of the type of said loan, the time length of said loan, a loan lender, a mortgage guaranty insurer, and credit of a borrower.

11. The method of claim 10, wherein said type of said loan is one of a fixed rate mortgage or an adjustable rate mortgage.

12. The method of claim 7, wherein said at least one discount point is a maximum of six discount points.

13. The method of claim 7, wherein said at least one discount point is a maximum of three discount points.

14. The method of claim 1, further comprising a step of determining basis points, wherein said first insurance premium is based on the amount of determined basis points.

15. The method of claim 14, wherein said basis points are determined based on at least one of said original LTV ratio, a coverage amount of said insurance, a debt-to-income ratio of a borrower, and the credit of said borrower.

16. The method of claim 14, wherein said steps of determining said original LTV ratio, adding the buydown cost, and determining basis points are performed by a computerized system.

17. A method for reducing a mortgage guaranty insurance premium associated with a loan, the method comprising the steps of:

determining an original loan-to-value (LTV) ratio of a loan, wherein said loan is one of a mortgage loan and a piggy-back loan and has an amount and an interest rate associated therewith, and wherein said original LTV ratio is the ratio of the amount of said loan to a value of an associated property, wherein said loan necessitates a purchase of insurance when said original LTV ratio exceeds a first pre-determined level, and wherein a first insurance premium would be charged for said insurance if said first insurance premium were based on said original LTV ratio;

adding a cost of at least one discount point to the amount of said loan, wherein said interest rate of said financial product is reduced as a result of the added cost of the at least one discount point;

achieving a gross LTV ratio of said loan, which is the ratio of the added cost of said at least one discount paint and the amount of said loan to said value of said associated property, as a result of adding said cost to the amount of said loan, wherein, when said gross LTV ratio exceeds at least a second pre-determined level above said original LTV ratio by the added cost of the at least one discount point as a result of the added cost of said buydown, the first insurance premium charged would be increased to a second insurance premium higher than the first insurance premium and corresponding to said gross LTV ratio if said gross LTV ratio were used to determine the insurance premium that should be charged for said insurance; and offering said insurance for the first insurance premium based on said original LTV ratio rather than on said gross LTV ratio, wherein the first insurance premium at which said insurance is offered is determined through usage of a computer.

18. The method of claim 17, wherein the cost of each discount point equals one percent of the amount of said loan.

19. The method of claim 18, wherein each said discount point reduces said interest rate within a range of approximately 0.20 to 0.33 percent.

20. The method of claim 19, wherein the amount of the reduction of said interest rate is further based on at least one of the type of said loan, the time length of said loan, a loan lender, a mortgage guaranty insurer, and credit of a borrower.

21. The method of claim 20, wherein said type of said loan is one of a fixed rate mortgage or an adjustable rate mortgage.

22. The method of claim 17, wherein said at least one discount point is a maximum of six discount points.

23. The method of claim 17, wherein said at least one discount point is a maximum of three discount points.

24. The method of claim 17, further comprising a step of determining basis points, wherein said first insurance premium is further based on the amount of determined basis points.

25. The method of claim 24, wherein said basis points are determined based on at least one of said original LTV ratio, a coverage amount of said insurance, a debt-to-income ratio of a borrower, and the credit of said borrower.

26. The method of claim 24, wherein said steps of determining said original LTV ratio, adding the buydown cost, and determining basis points are performed by a computerized system.

27. The method of claim 17, wherein said value in said original LTV ratio and said gross LTV ratio is the least of a sales price, appraisal, and broker price opinion.

* * * * *